US008976298B2

(12) United States Patent
Turkington et al.

(10) Patent No.: US 8,976,298 B2
(45) Date of Patent: *Mar. 10, 2015

(54) EFFICIENT 2D ADAPTIVE NOISE THRESHOLDING FOR VIDEO PROCESSING

(71) Applicant: Altera Corporation, San Jose, CA (US)

(72) Inventors: Kieron Turkington, London (GB); Vivek Gowri-Shankar, Oxford (GB)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/189,534

(22) Filed: Feb. 25, 2014

(65) Prior Publication Data

US 2014/0300818 A1    Oct. 9, 2014

Related U.S. Application Data

(63) Continuation of application No. 13/857,773, filed on Apr. 5, 2013, now Pat. No. 8,704,951.

(51) Int. Cl.
*H04N 5/00* (2011.01)
*H04N 5/21* (2006.01)
*G06T 5/00* (2006.01)
*G06T 5/50* (2006.01)
*H04N 5/213* (2006.01)

(52) U.S. Cl.
CPC  *H04N 5/21* (2013.01); *G06T 5/002* (2013.01); *G06T 5/50* (2013.01); *G06T 2207/10016* (2013.01); *H04N 5/213* (2013.01)
USPC .......................................................... 348/607

(58) Field of Classification Search
USPC ......... 348/607, 611, 614, 618–622, 666, 441, 348/448
See application file for complete search history.

(56) References Cited

U.S. PATENT DOCUMENTS

| 6,061,100 | A  | 5/2000  | Ward et al.    |
|-----------|----|---------|----------------|
| 7,272,265 | B2 | 9/2007  | Kouri et al.   |
| 7,567,300 | B2 | 7/2009  | Satou et al.   |
| 7,830,967 | B1 | 11/2010 | Jannard et al. |
| 7,990,471 | B1 | 8/2011  | Otobe et al.   |

(Continued)

OTHER PUBLICATIONS

U.S. Appl. No. 13/857,773, Efficient 2D adaptive noise thresholding for video processing, Turkington et al., filed Apr. 5, 2013.

(Continued)

*Primary Examiner* — Paulos M Natnael
(74) *Attorney, Agent, or Firm* — Weaver Austin Villeneuve & Sampson LLP

(57) ABSTRACT

Various embodiments of the present disclosure provide techniques for performing video denoising (VDN). An adaptive noise threshold is dynamically determined and used to distinguish between frame to frame differences in pixel values that relate to image motion from those differences that relate to noise. The disclosed techniques enable the noise threshold to be continuously updated, for example as frequently as once per frame, so that the noise threshold may closely track to varying levels of noise in the input video data. The techniques may be implemented in, for example, a video format conversion apparatus. Advantageously, the techniques may be incorporated in programmable logic devices (PLD's) or Field Programmable Gate Arrays (FPGA's) configurable to perform video format conversion, while adding only modest additional computational demands on the apparatus.

17 Claims, 4 Drawing Sheets

(56) References Cited

U.S. PATENT DOCUMENTS

| | | | |
|---|---|---|---|
| 8,004,586 B2* | 8/2011 | Yoo et al. | 348/241 |
| 8,165,415 B2* | 4/2012 | Hsu | 382/269 |
| 8,224,109 B2 | 7/2012 | Bosco et al. | |
| 8,284,313 B2 | 10/2012 | Lee et al. | |
| 8,351,510 B1 | 1/2013 | Masterson et al. | |
| 8,358,380 B2* | 1/2013 | Schoenblum et al. | 348/607 |
| 8,395,684 B2 | 3/2013 | Ooishi | |
| 8,638,395 B2* | 1/2014 | Schoenblum et al. | 348/606 |
| 8,704,951 B1* | 4/2014 | Turkington et al. | 348/607 |
| 2008/0106642 A1 | 5/2008 | Srinivasan et al. | |
| 2008/0123740 A1* | 5/2008 | Ye | 375/240.11 |
| 2010/0272376 A1* | 10/2010 | Hsu | 382/261 |
| 2010/0309379 A1 | 12/2010 | Schoenblum et al. | |
| 2010/0309989 A1* | 12/2010 | Schoenblum | 375/240.29 |
| 2011/0075027 A1 | 3/2011 | Wu et al. | |
| 2012/0170655 A1* | 7/2012 | Lee et al. | 375/240.16 |
| 2012/0207218 A1 | 8/2012 | Asamura et al. | |

OTHER PUBLICATIONS

U.S. Appl. No. 13/857,773 Notice of Allowance mailed Dec. 18, 2013.

Extended European Search Report dated Oct. 20, 2014 for EP Application No. 14163030.1.

Richards, J. W. et al., "Experience with a prototype motion compensated standards converter for down-conversion of 1125/60/2:1 SMPTE-240 M high definition to 625/50/2:1 video", Broadcasting Convention, 1992. IBC., International Amsterdam, Netherlands, London, UK, IEE, UK, Jan. 1, 1992, pp. 56-61.

\* cited by examiner

EFFICIENT 2D ADAPTIVE NOISE THRESHOLDING FOR VIDEO PROCESSING

CROSS-REFERENCE TO RELATED APPLICATIONS

This patent application is a continuation of and claims priority, under 35 U.S.C. §120, to co-pending U.S. patent application Ser. No. 13/857,773, filed Apr. 5, 2013, and titled "EFFICIENT 2D ADAPTIVE NOISE THRESHOLDING FOR VIDEO PROCESSING", which is hereby incorporated by reference in its entirety.

FIELD OF THE INVENTION

The present disclosure relates generally to video processing, and, more particularly, to techniques for dynamically adapting a threshold for distinguishing between frame to frame differences in pixel values that relate to image motion from those differences that relate to noise.

BACKGROUND

Processing of video data, including for example data output by a video camera, may include format conversions of various types, and noise detection and/or suppression.

Image format conversion is a commonly used function in various video cameras and video displays, and for broadcast infrastructure systems, such as servers, switchers, head-end encoders, and specialty studio displays. Image format conversion applications, for example, may include up-, down-, and cross-conversion of standard-definition and high-definition video streams in interlaced or progressive format. A format conversion application may convert image formats for one or more channels of video received over a serial digital interface (SDI) or a digital visual interface (DVI). The received video may be standard definition (SD), high definition (HD), or 3G-SDI (full HD). The converted image may be mixed and displayed over user-selectable output such as SDI, DVI, or high-definition multimedia interface (HDMI). An image format conversion application may be incorporated in an intellectual property (IP) module or IP block of a programmable logic device (PLD) or field programmable gate array (FPGA), for example.

Video data output by video cameras typically contains some amount of zero-mean Gaussian noise, which may be referred to as "white noise". The white noise characteristically entails small random differences from frame to frame in pixel values that are not due to motion of an image element depicted by the pixel. To improve image quality, it is desirable to suppress the noise without distorting differences in frame to frame pixel values that result from motion of the image element. Frame to frame differences in pixel values typically vary in a non-deterministic manner, both temporally and spatially, as a result of, at least, image element motions and noise. Consequently, distinguishing between differences resulting from noise and differences resulting from motion of an image element can be challenging.

Accordingly, various embodiments described hereinbelow seek to improve upon techniques for distinguishing between frame to frame differences in pixel values that relate to image motion from those differences that relate to noise.

SUMMARY OF THE INVENTION

The presently disclosed techniques automatically and dynamically determine a threshold ("noise threshold") for distinguishing between frame to frame differences in pixel values that relate to image motion from those differences that relate to noise for purposes of video denoising (VDN).

The adaptive noise threshold may be dynamically determined and used to distinguish between frame to frame differences in pixel values that relate to image motion from those differences that relate to noise. The disclosed techniques enable the noise threshold to be continuously updated, for example as frequently as once per frame, so that the noise threshold may closely track to varying levels of noise in the input video data. The techniques may be implemented in, for example, a video format conversion apparatus. Advantageously, the techniques may be incorporated in programmable logic devices (PLD's) or Field Programmable Gate Arrays (FPGA's) configurable to perform video format conversion, while adding only modest additional computational demands on the apparatus These and other features will be presented in more detail in the following specification of the invention and the accompanying figures, which illustrate by way of example the principles of the invention.

BRIEF DESCRIPTION OF THE DRAWINGS

The above techniques and mechanisms, together with other features, embodiments, and advantages of the present disclosure, may best be understood by reference to the following description taken in conjunction with the accompanying drawings, which illustrate various embodiments of the present techniques and mechanisms. In the drawings, structural elements having the same or similar functions are denoted by like reference numerals.

DETAILED DESCRIPTION OF EXAMPLE EMBODIMENTS

Various embodiments of the present disclosure provide techniques for automatically and dynamically determining a threshold ("noise threshold") for distinguishing between frame to frame differences in pixel values that relate to image motion from those differences that relate to noise.

The disclosed techniques enable the noise threshold to be continuously updated, for example as frequently as once per frame, so that the noise threshold may closely track to varying levels of noise in the input video data. The techniques may be implemented in, for example, a video format conversion apparatus. Advantageously, the techniques may be incorporated in programmable logic devices (PLD's) or Field Programmable Gate Arrays (FPGA's) configurable to perform video format conversion, while adding only modest additional computational demands on the apparatus.

Figure 1:
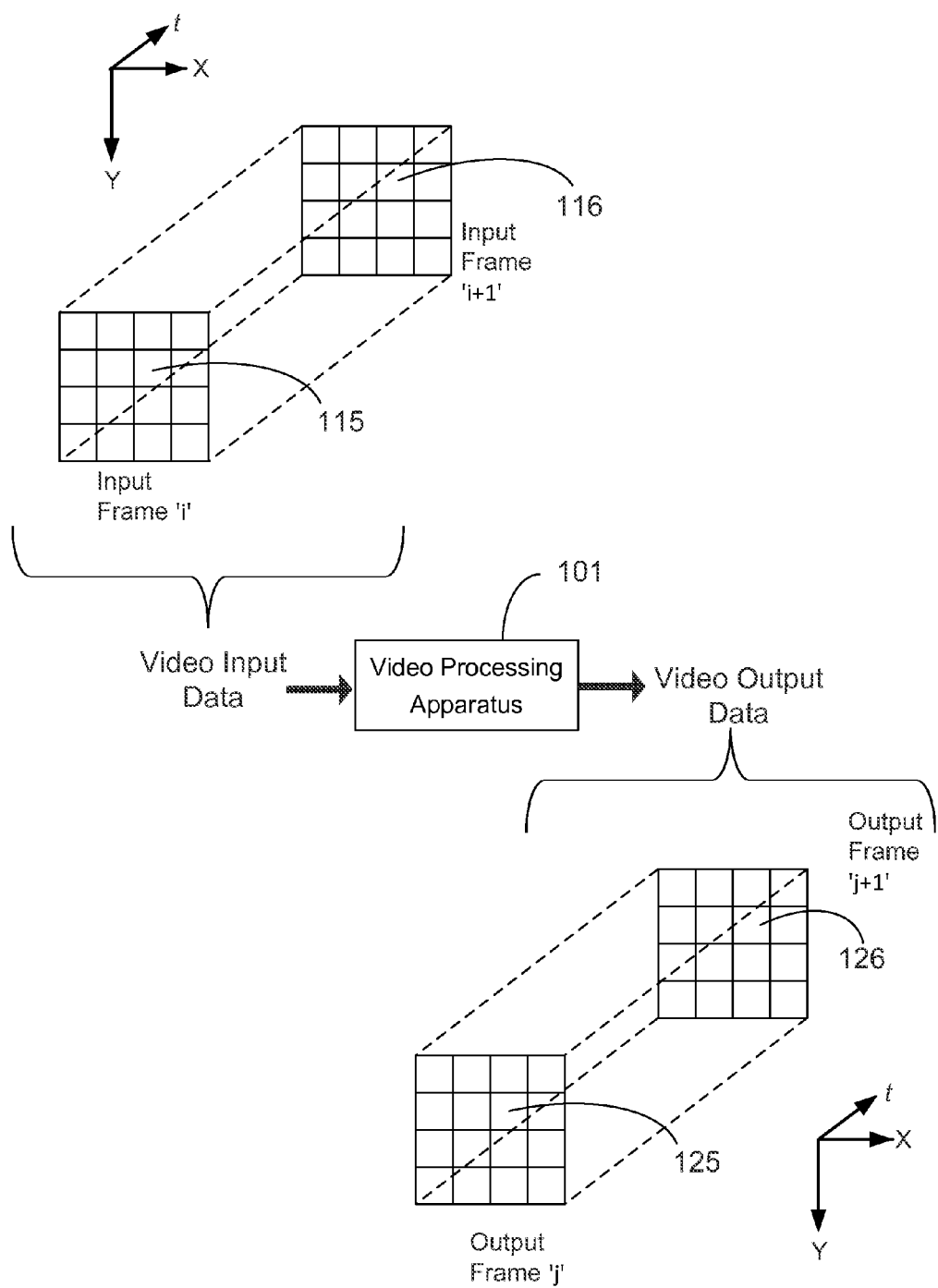
FIG. 1 illustrates an example block diagram of a video processing apparatus.

The disclosed techniques may be better understood by referring first to FIG. 1, which shows an example of a video processing apparatus. Apparatus 101 may be configured to receive a plurality of input frames of video data from an input image source (not illustrated). In an implementation, the plurality of input frames may be arranged in a temporal sequence. The input image source may include another component of the apparatus, such as, for example a memory or input device of the apparatus. In addition, or alternatively, the input image source may be partly or entirely external to the apparatus. For example, the input image source may be coupled to the apparatus by a broadcast or cellular network, or the Internet.

Video processing apparatus 101 may be configured to perform image format conversion such as, for example, up-, down-, and cross-conversion of standard-definition and high-definition video streams in interlaced or progressive format. Video processing apparatus 101 may convert image formats for one or more channels of video received over a serial digital interface (SDI) or a digital visual interface (DVI). The received video data may be standard definition (SD), high definition (HD), or 3G-SDI (full HD), encoded in RGB or YCbCr format, for example. The converted image may be mixed and displayed over user-selectable output such as SDI, DVI, or high-definition multimedia interface (HDMI). More particularly, video processing apparatus 101 may be configured to perform noise suppression, or video denoising (VDN), of received input frames of video data.

The input frames may be received, on a frame by frame basis, for example, where each input frame includes a number of input pixels. Video processing apparatus 101 may be configured to generate, for each input frame, an output frame of video data, the output frame of video data having undergone VDN in accordance with the presently disclosed techniques. In an implementation, VDN is performed by determining, on a pixel by pixel basis, whether a difference between pixel value of an input frame and a pixel value of a reference frame is attributable to noise, rather than to motion of an image element depicted by the pixel. Advantageously, the determination is made with reference to a noise threshold that is dynamically updated as described hereinbelow. For example, an input pixel may be identified as benefiting from VDN only when a computed value of a sum of absolute values of differences (SAD) between pixel values of each pixel in a portion of image data of the input frame with respect to a corresponding pixel of a reference frame does not exceed a dynamically adjusted noise threshold. Then, an output frame may be generated, for each input frame, by applying VDN only to the input pixels identified as benefiting from VDN.

Each pixel in a frame may have a spatial coordinate location defined by its spatial (x, y) coordinates within the frame, and by its temporal coordinates, which may be defined by frame number. For example, referring still to FIG. 1, pixel 115 in input frame 'i' may be identified as (3, 2, i). Pixel 125 in output frame 'j', located at the same spatial (x, y) coordinate, may be said to correspond to pixel 115, and be identified as (3, 2, j). Similarly, pixel 126 in output frame 'j+1' may be identified as (3, 2, j+1) and be said to correspond to pixel 116 (3, 2, i+1). Although for clarity of illustration, each illustrated video frame includes only 16 pixels, it will be appreciated that the presently disclosed techniques may be advantageously employed with video frames incorporating an arbitrarily large number of pixels per frame.

Figure 2A:
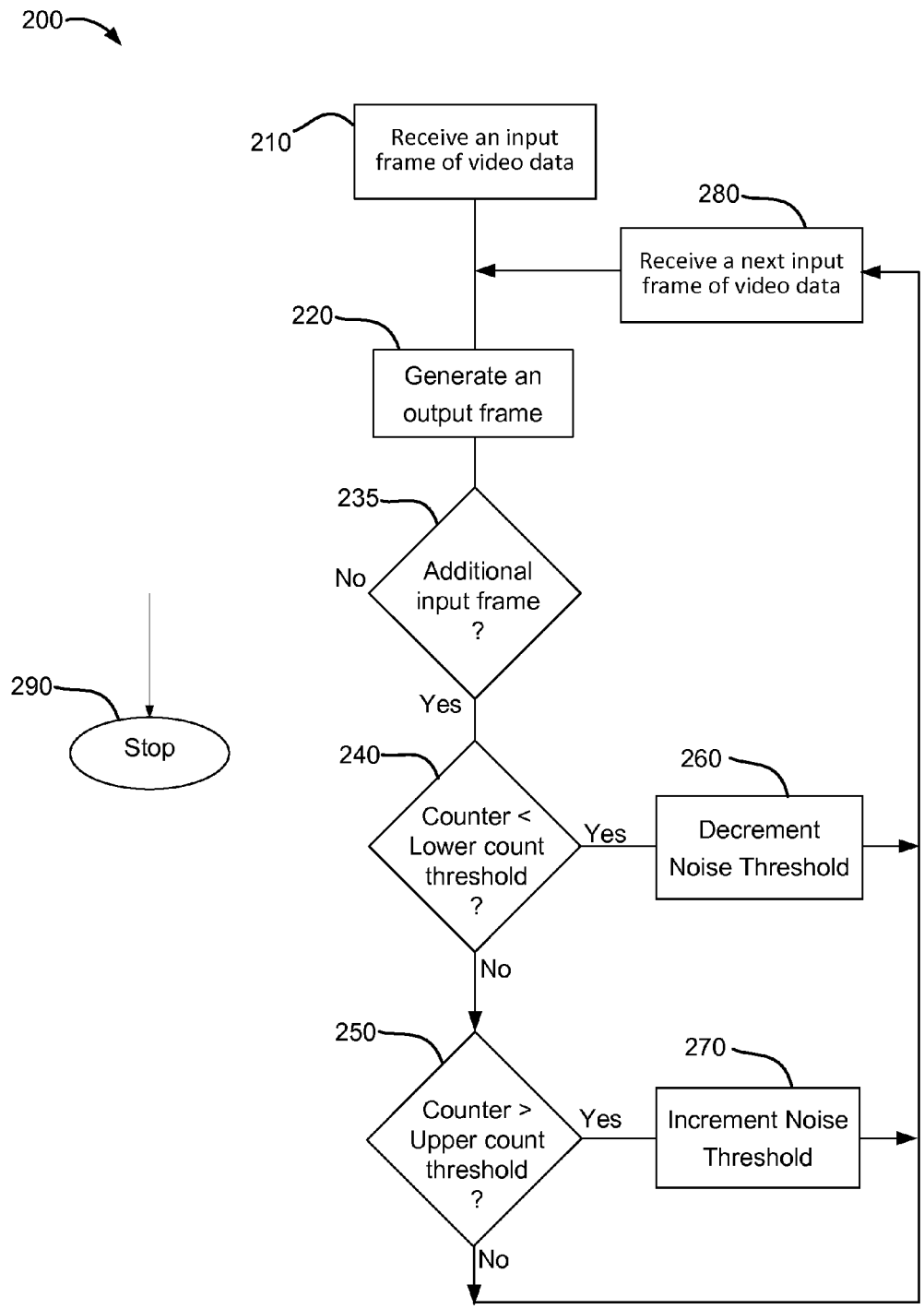
FIG. 2A and FIG. 2B illustrate an example of a process flow diagram according to an implementation.
Figure 2B:
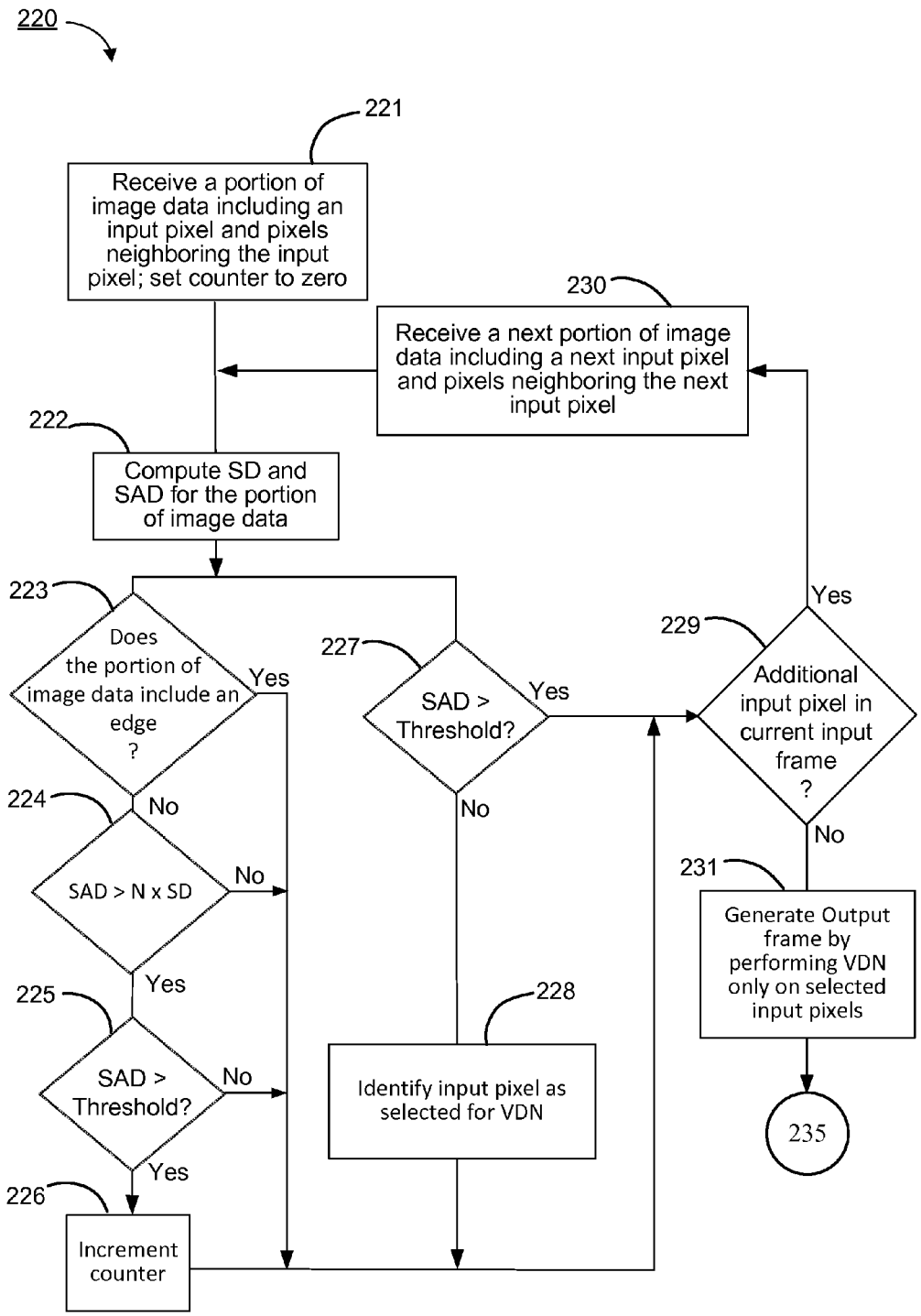

Referring now to FIGS. 2A and 2B, an example of a process for performing VDN in accordance with an implementation will be described. Referring first to FIG. 2A, in an implementation, VDN method 200 may be performed by video processing apparatus 101 as depicted in FIG. 1.

The method may begin at block 210 with receiving an input frame of video data, the input frame including a plurality of input pixels. The input frame may be received from another component of an apparatus including an electronic display, such as, for example a memory or input device of the apparatus. In addition, or alternatively, the source of the input frame may be external to the apparatus. For example, the input image source may be coupled to the apparatus by a broadcast or cellular network, or the Internet.

At block 220, an output frame of video data may be generated. The output frame may include output pixels at least some of which have undergone VDN, in accordance with a method illustrated in FIG. 2B.

Turning now to FIG. 2B, the input frame may be processed as a successive plurality of "portions" of image data. Each portion, received at block 221, may include an input pixel the value of which may be adjusted according to the presently disclosed techniques to generate an output pixel. It will be appreciated that the pixel "value" as the term is used herein, and in the claims may include one or more numeric values characterizing image data to be associated with the pixel. For example, the pixel value, may include information as to one or more components of an RGB or YCbCr color space.

Each portion may also include a number of pixels "neighboring" the input pixel. For example, the portion of image data may consist of a 3×3 array of pixels. Referring again to FIG. 1, and the nomenclature described hereinabove, when the input pixel is pixel 115, located at (3, 2), the portion of image data to be received along with pixel 115 may include pixels located at (2,1), (2,2), (2,3), (3,1), (3,3), (4,1), (4,2), and (4,3). Although, for simplicity, a 3×3 array of pixels will be described herein as constituting a portion of image data, the portion of image data may, instead, include an array of pixels of greater size. Moreover the portion of image data is not necessarily square. A rectangular, or approximately hexagonal, octagonal, circular or oval shaped portion may be contemplated.

At block 221, a counter may be set to zero, where the counter, as described hereinbelow, may be incremented for each pixel in a current input frame for which VDN is performed.

At block 222, analysis of the portion of image data may be performed, the analysis including computation of a sum of differences (SD) and a sum of absolute values of differences (SAD) between pixel values of each pixel in the portion of image data of the input frame with respect to a corresponding pixel of a reference frame. In an implementation, the reference frame may be a frame immediately preceding the input frame. However, the reference frame may be any adjacent, or nearly adjacent, frame of data preceding or following the input frame. In an implementation, the reference frame may be a previously produced output frame that results from application of VDN. For shortness of explanation, the term SAD may be used hereinbelow, and in the claims. However it will be appreciated that equivalent techniques, such as sum-squared error (SSE) and the like, may be used in some embodiments and that the example implementations disclosed herein and recited in the claims are not limited to SAD-based difference measurements. Following block 222 the process may proceed in parallel to block 223 and block 227.

At block 223, a determination may be made as to whether the portion of image data includes an edge. Any type of edge detection algorithm may be contemplated as forming a part of block 223. For example, in an implementation, a 3×3 portion of the input (and reference) frame may be multiplied by the following matrix:

$$\begin{bmatrix} -1 & -1 & -1 \\ -1 & 8 & -1 \\ -1 & -1 & -1 \end{bmatrix}$$

to obtain a computed edged detection value. In an area of flat color, where all the pixels may have roughly the same value, the eight −1's cancel the single +8 in the middle to produce computed edge detection value close to zero. In areas with an edge, the values won't cancel and the computed edge detection value will be a value substantially greater than zero. To determine the presence of an edge the user may set a quantitative edge threshold to which computed edge detection value may be compared.

When the determination is that the portion of image data includes an edge, the process may proceed to block 229.

On the other hand, when it is determined that the computed edge detection value does not indicate presence of an edge, the process may proceed to block 224, wherein a determination is made whether SAD is substantially larger than SD. For example, the computed SAD value may be compared to a multiple N times the computed SD value. In an implementation, N may be an integer between 5 and 50. Advantageously, N may be $2^n$ where 'n' equals, for example 4. When the determination is that SAD does not exceed N×SD, then it may be concluded that a difference between the value of the input pixel value and a corresponding pixel value of the reference frame is attributable to motion of an image element depicted by the pixel. Accordingly, sampling the noise value at that pixel would not be beneficial, and the process may proceed directly to block 229.

On the other hand, when it is determined at block 224 that the computed SAD value exceeds N×SD, it may be concluded that the difference between the value of the input pixel value and a corresponding pixel value of the reference frame is attributable to noise. Accordingly, the process may proceed to block 225, wherein SAD is compared to a current threshold noise level. If the SAD is found to exceed the current threshold noise level, the process may proceed to block 226, otherwise the process may proceed block 229.

At block 226, the counter may be incremented, and the process may proceed to block 229.

In parallel with blocks 223 to 226, at block 227, SAD may be compared to the current threshold noise level. If the SAD is found to exceed the current threshold noise level, the process may proceed to block 229. On the other hand, when it is determined at block 227 that the computed SAD value does not exceed the threshold noise level it may be concluded that the difference between the value of the input pixel value and a corresponding pixel value of the reference frame is attributable to noise. Accordingly, the process may proceed to block 228, wherein the input pixel may be identified as being selected for VDN, prior to proceeding to block 229.

At block 229, a determination may be made whether there is an additional input pixel in the current input frame. When the determination is that there is no additional input pixel, the process may proceed to block 231, wherein an output frame may be generated by performing VDN only on the selected input pixels. For example, for each selected input pixel, a corresponding output pixel may be assigned a value equal to an average of corresponding pixels in two or more nearby frames. In addition, or alternatively, other techniques for VDN may be applied at block 231 as well. Subsequently to block 231, the process may proceed to block 235 (FIG. 2A).

On the other hand, when the determination is that there is an additional input pixel in the current input frame, the process may proceed to block 230. At block 230, a next portion of image data may be received, including a next input pixel and pixels neighboring the next input pixel, and the process may proceed with blocks 222-229.

Referring again to FIG. 2A, at block 235a determination may be made as to whether there is an additional input frame. When the determination is that there is no additional input frame, the process may stop, block 290.

On the other hand, when the determination is that there is an additional input frame, the process may proceed to block 240. At block 240, the current counter value may be compared to a lower count threshold. When a determination is made that the current counter value is less than the lower count threshold, the process may proceed to block 260. At block 260, the noise threshold may be decremented, and the process may proceed to block 280.

On the other hand, when a determination is made that the current counter value is less than a lower count threshold, the process may proceed to block 250. At block 250, the current counter value may be compared to an upper count threshold. When a determination is made that the current counter value is greater than the upper count threshold, the process may proceed to block 270. At block 270, the noise threshold may be incremented, and the process may proceed to block 280.

At block 280, a next input frame of video data may be received and the process may proceed to block 220.

Figure 3:
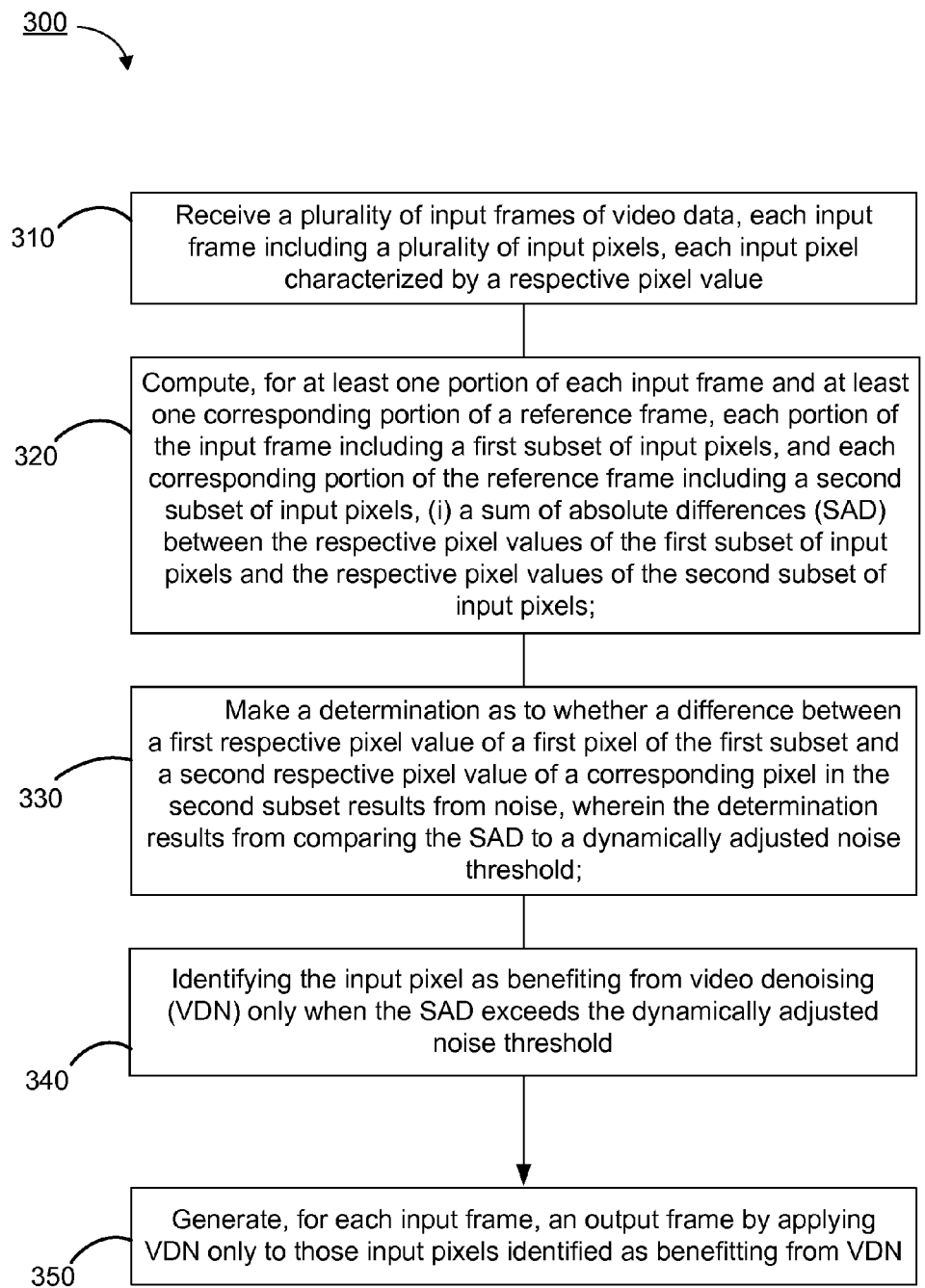
FIG. 3 illustrates an example of a process flow diagram according to an implementation.

Referring now to FIG. 3, another example of a process for performing VDN will be described. Process 300 may begin at block 310, with receipt of a plurality of input frames of video data. Each input frame may include a plurality of input pixels. Each input pixel may be characterized by a respective pixel value.

At block 320, a sum of absolute differences (SAD) may be computed. The SAD may be computed for at least one portion of each input frame and at least one corresponding portion of a reference frame. Each portion of the input frame may include a first subset of input pixels, and each corresponding portion of the reference frame may include a second subset of input pixels. The SAD may be the sum of absolute differences between the respective pixel values of the first subset of input pixels and the respective pixel values of the second subset of input pixels.

At block 330, a determination may be made as to whether a difference between a first respective pixel value of a first pixel of the first subset and a second respective pixel value of a corresponding pixel in the second subset results from noise. The determination may result from comparing the SAD to a dynamically adjusted noise threshold.

At block 340, the input pixel may be identified as benefiting from video denoising (VDN) only when the SAD exceeds the dynamically adjusted noise threshold.

At block 350, an output frame may be generated for each input frame by applying VDN only to those input pixels identified as benefitting from VDN.

The above described processes may be controlled or executed by a video processing apparatus, which may include a controller including one or more programmable logic devices or field programmable gate arrays. It will be appreciated that the controller may be implemented as electronic hardware, computer software, or combinations of both. The hardware and data processing apparatus used to implement the various embodiments may be implemented or performed with a general purpose single- or multi-chip processor, a digital signal processor (DSP), an application specific integrated circuit (ASIC), a field programmable gate array, programmable logic device, discrete gate or transistor logic, discrete hardware components, or any combination thereof.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, a data processing apparatus.

If implemented in software, the functions may be stored as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may be non-transitory and may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Thus, techniques for dynamically adapting a threshold for distinguishing between frame to frame differences in pixel values that relate to image motion from those differences that relate to noise has been disclosed.

Although the foregoing systems and methods have been described in detail by way of illustration and example for purposes of clarity and understanding, it will be recognized that the above described systems and methods may be embodied in numerous other variations and embodiments without departing from the spirit or essential characteristics of the systems and methods. Certain changes and modifications may be practiced, and it is understood that the systems and methods are not to be limited by the foregoing details, but rather is to be defined by the scope of the appended claims.

What is claimed is:

1. A method for processing video data, the method comprising:
   receiving, at a video processing apparatus, a plurality of input frames of video data, each input frame including a plurality of input pixels, each input pixel characterized by a respective pixel value, the video processing apparatus:
      computing, for at least one portion of each input frame and at least one corresponding portion of a reference frame, each portion of the input frame including a first subset of input pixels, and each corresponding portion of the reference frame including a second subset of input pixels, a sum of absolute differences (SAD) between the respective pixel values of the first subset of input pixels and the respective pixel values of the second subset of input pixels; and
   generating, for each input frame, an output frame by applying video denoising (VDN) only to those input pixels for which the SAD does not exceed a dynamically adjusted noise threshold; wherein
      the dynamically adjusted noise threshold results from iteratively comparing a count of a number of pixels per frame for which the SAD is greater than a current noise threshold, and incrementing the current noise threshold when the count exceeds a count threshold, and decrementing the noise threshold when the count is less than the count threshold.

2. The method of claim 1, further comprising:
   computing a sum of differences (SD) between the respective pixel values of the first subset of input pixels and the respective pixel values of the second subset of input pixels; and
   incrementing the count of the number of pixels per frame for which the SAD is greater than the current noise threshold when the portion of the input frame does not include an edge, SAD is substantially greater than SD, and SAD is greater than a current noise threshold.

3. The method of claim 1, wherein the dynamically adjusted noise threshold results from iteratively comparing the count to a lower count threshold and to an upper count threshold, incrementing the noise threshold when the count exceeds the upper count threshold, and decrementing the noise threshold when the count is less than the lower count threshold.

4. The method of claim 1, wherein VDN comprises assigning an output pixel value equal to an average of corresponding pixels in at least two proximal frames.

5. The method of claim 1, wherein the respective pixel value includes information as to at least one component of an RGB or YCbCr color space.

6. The method of claim 1, wherein the at least one portion of each input frame is a plurality of pixels centered about the first pixel.

7. The method of claim 6, wherein the at least one portion of each input frame is a 3×3 array of pixels.

8. The method of claim 6, wherein the at least one portion of each input frame comprises a shape approximating at one or more of the following shapes: a rectangle, a hexagon, an octagon, a circle, or an oval.

9. The method of claim 1, wherein the reference frame precedes the input frame.

10. The method of claim 9, wherein the reference frame immediately precedes the input frame.

11. The method of claim 1, wherein the reference frame is a previously produced output frame that results from application of VDN.

12. A video processing apparatus comprising a processor for:
   receiving a plurality of input frames of video data, each input frame including a plurality of input pixels, each input pixel characterized by a respective pixel value;
   computing, for at least one portion of each input frame and at least one corresponding portion of a reference frame, each portion of the input frame including a first subset of input pixels, and each corresponding portion of the reference frame including a second subset of input pixels, a sum of absolute differences (SAD) between the respective pixel values of the first subset of input pixels and the respective pixel values of the second subset of input pixels; and
   generating, for each input frame, an output frame by applying video denoising (VDN) only to those input pixels for which the SAD does not exceed a dynamically adjusted noise threshold; wherein
      the dynamically adjusted noise threshold results from iteratively comparing a count of a number of pixels per frame for which the SAD is greater than a current noise threshold, and incrementing the current noise threshold when the count exceeds a count threshold, and decrementing the noise threshold when the count is less than the count threshold.

13. The apparatus of claim 12, wherein the processor:
computes a sum of differences (SD) between the respective pixel values of the first subset of input pixels and the respective pixel values of the second subset of input pixels; and
increments the count of the number of pixels per frame for which the SAD is greater than the current noise threshold when the portion of the input frame does not include an edge, SAD is substantially greater than SD, and SAD is greater than a current noise threshold.

14. The apparatus of claim 12, wherein the dynamically adjusted noise threshold results from iteratively comparing the count to a lower count threshold and to an upper count threshold, incrementing the noise threshold when the count exceeds the upper count threshold, and decrementing the noise threshold when the count is less than the lower count threshold.

15. The apparatus of claim 12, wherein the video processing apparatus comprises a programmable logic device or field programmable gate array.

16. A non-transitory computer-readable storage medium having stored thereon instructions which, when executed by a controller, cause the controller to perform operations, the operations comprising:
receiving a plurality of input frames of video data, each input frame including a plurality of input pixels, each input pixel characterized by a respective pixel value;
computing, for at least one portion of each input frame and at least one corresponding portion of a reference frame, each portion of the input frame including a first subset of input pixels, and each corresponding portion of the reference frame including a second subset of input pixels, a sum of absolute differences (SAD) between the respective pixel values of the first subset of input pixels and the respective pixel values of the second subset of input pixels; and
generating, for each input frame, an output frame by applying video denoising (VDN) only to those input pixels for which the SAD does not exceed a dynamically adjusted noise threshold; wherein
the dynamically adjusted noise threshold results from iteratively comparing a count of a number of pixels per frame for which the SAD is greater than a current noise threshold, and incrementing the current noise threshold when the count exceeds a count threshold, and decrementing the noise threshold when the count is less than the count threshold.

17. The non-transitory computer-readable storage medium of claim 16, the operations further comprising:
computing a sum of differences (SD) between the respective pixel values of the first subset of input pixels and the respective pixel values of the second subset of input pixels; and
incrementing the count of the number of pixels per frame for which the SAD is greater than the current noise threshold when the portion of the input frame does not include an edge, SAD is substantially greater than SD, and SAD is greater than a current noise threshold.

* * * * *